United States Patent
Murakawa et al.

(10) Patent No.: US 11,532,413 B2
(45) Date of Patent: Dec. 20, 2022

(54) FERRITE SINTERED MAGNET AND ROTARY ELECTRICAL MACHINE COMPRISING THE SAME

(71) Applicant: TDK Corporation, Tokyo (JP)

(72) Inventors: Yoshitaka Murakawa, Tokyo (JP); Shogo Muroya, Tokyo (JP); Hiroyuki Morita, Tokyo (JP); Masanori Ikeda, Tokyo (JP)

(73) Assignee: TDK Corporation, Tokyo (JP)

(*) Notice: Subject to any disclaimer, the term of this patent is extended or adjusted under 35 U.S.C. 154(b) by 253 days.

(21) Appl. No.: 16/826,812

(22) Filed: Mar. 23, 2020

(65) Prior Publication Data
US 2020/0312496 A1    Oct. 1, 2020

(30) Foreign Application Priority Data

Mar. 27, 2019   (JP) .............................. JP2019-059949

(51) Int. Cl.
*H01F 1/11*         (2006.01)
*H02K 1/02*         (2006.01)
(Continued)

(52) U.S. Cl.
CPC ............ *H01F 1/11* (2013.01); *C04B 35/2633* (2013.01); *C04B 35/2683* (2013.01); *H01F 1/10* (2013.01);
(Continued)

(58) Field of Classification Search
CPC .... H01F 1/11; H01F 1/10; H02K 1/02; C04B 35/2633; C04B 2235/3274;
(Continued)

(56) References Cited

U.S. PATENT DOCUMENTS 6,858,156 B2   2/2005   Takami et al.
9,460,835 B2   10/2016  Taguchi
(Continued)

FOREIGN PATENT DOCUMENTS

CN      104508769 A    4/2015
CN      104900363 A    9/2015
(Continued)

OTHER PUBLICATIONS

U.S. Notice of Allowance dated Apr. 13, 2022 issued in U.S. Appl. No. 16/823,871.

*Primary Examiner* — C Melissa Koslow
(74) *Attorney, Agent, or Firm* — Faegre Drinker Biddle & Reath LLP

(57) ABSTRACT

A ferrite sintered magnet 100 comprises M-type ferrite crystal grains 4 having a hexagonal structure, two-crystal grain boundaries 6a formed between two of the M-type ferrite crystal grains 4, and multiple-crystal grain boundaries 6b surrounded by three or more of the M-type ferrite crystal grains 4. This ferrite sintered magnet 100 contains at least Fe, Ca, B, and Si, and contains B in an amount of 0.005 to 0.9 mass % in terms of $B_2O_3$, the two-crystal grain boundaries 6a and the multiple-crystal grain boundaries 6b contain Si and Ca, and in a cross-section parallel to a c-axis of the ferrite sintered magnet, when the number of multiple-crystal grain boundaries 6b having a maximum length of 0.49 to 5 μm per cross-sectional area of 76 μm² is N, N is 7 or less.

12 Claims, 3 Drawing Sheets

(51) Int. Cl.
*C04B 35/26* (2006.01)
*H01F 1/10* (2006.01)

(52) U.S. Cl.
CPC ........ *H02K 1/02* (2013.01); *C04B 2235/3208* (2013.01); *C04B 2235/3241* (2013.01); *C04B 2235/3262* (2013.01); *C04B 2235/3274* (2013.01); *C04B 2235/3284* (2013.01); *C04B 2235/3409* (2013.01); *C04B 2235/3418* (2013.01); *C04B 2235/3454* (2013.01); *C04B 2235/5409* (2013.01); *C04B 2235/767* (2013.01); *C04B 2235/78* (2013.01); *C04B 2235/785* (2013.01); *C04B 2235/786* (2013.01); *C04B 2235/85* (2013.01)

(58) Field of Classification Search
CPC ...... C04B 2235/3454; C04B 2235/786; C04B 2235/85; C04B 2235/3208; C04B 2235/3241; C04B 2235/3262; C04B 2235/3284; C04B 2235/3418; C04B 2235/3409
See application file for complete search history.

(56) References Cited

U.S. PATENT DOCUMENTS

| | | | |
|---|---|---|---|
| 9,514,871 B2 | 12/2016 | Taguchi | |
| 9,589,713 B2 | 3/2017 | Murakawa et al. | |
| 9,748,026 B2 | 8/2017 | Shirata | |
| 2009/0314981 A1 | 12/2009 | Yanagida et al. | |
| 2012/0105185 A1 | 5/2012 | Oda et al. | |
| 2012/0280167 A1 | 11/2012 | Yanagida et al. | |
| 2013/0285779 A1 | 10/2013 | Kobayashi et al. | |
| 2014/0097378 A1 | 4/2014 | Yanagida et al. | |
| 2015/0053883 A1 | 2/2015 | Taguchi | |
| 2015/0221424 A1 | 8/2015 | Kobayashi et al. | |
| 2015/0235748 A1 | 8/2015 | Kobayashi et al. | |
| 2015/0255197 A1 | 9/2015 | Murakawa et al. | |
| 2015/0255198 A1 | 9/2015 | Murakawa et al. | |
| 2015/0325350 A1 | 11/2015 | Taguchi | |
| 2015/0332819 A1 | 11/2015 | Oda et al. | |
| 2017/0207012 A1 | 7/2017 | Morita | |
| 2018/0277290 A1 | 9/2018 | Kim et al. | |
| 2019/0304643 A1 | 10/2019 | Morita et al. | |
| 2019/0318856 A1 | 10/2019 | Nagaoka et al. | |
| 2020/0312493 A1 | 10/2020 | Murakawa et al. | |
| 2020/0312494 A1* | 10/2020 | Murakawa | H01F 1/11 |
| 2021/0118598 A1 | 4/2021 | Murakawa et al. | |

FOREIGN PATENT DOCUMENTS

| | | |
|---|---|---|
| CN | 104973858 A | 10/2015 |
| CN | 105130413 A | 12/2015 |
| CN | 111755193 A | 10/2020 |
| EP | 1 953 123 A1 | 8/2008 |
| EP | 1 981 044 A2 | 10/2008 |
| EP | 2 819 129 A1 | 12/2014 |
| EP | 2 916 328 A2 | 9/2015 |
| EP | 3 633 697 A1 | 4/2020 |
| JP | 2002-141212 A | 5/2002 |
| JP | 2015-181147 A | 10/2015 |
| JP | 2017-005004 A | 1/2017 |
| JP | 2017-126719 A | 7/2017 |
| JP | 2019-172509 A | 10/2019 |
| KR | 10-1131795 B1 | 3/2012 |
| WO | WO-2011/001831 A1 | 1/2011 |
| WO | WO-2013/125600 A1 | 8/2013 |
| WO | WO-2013/125601 A1 | 8/2013 |
| WO | WO-2014/050433 A1 | 4/2014 |
| WO | WO-2018/117261 A1 | 6/2018 |
| WO | WO-2018/216594 A1 | 11/2018 |

\* cited by examiner

FERRITE SINTERED MAGNET AND ROTARY ELECTRICAL MACHINE COMPRISING THE SAME

TECHNICAL FIELD

The present invention relates to a ferrite sintered magnet and a rotary electrical machine comprising the same.

BACKGROUND

As magnetic materials to be used in ferrite sintered magnets, Ba ferrite, Sr ferrite, and Ca ferrite having a hexagonal structure are known. In recent years, among these, magnetoplumbite-type (M-type) ferrite has attracted attention as a magnet material for rotary electrical machines such as motors. The M-type ferrite is usually represented by the formula of $AFe_{12}O_{19}$.

In recent years, as M-type ferrites, those not containing rare earth elements and Co, such as those containing Na, have been developed from the viewpoint of reducing raw material costs.

CITATION LIST

Patent Literature

[Patent Literature 1] International Publication No. WO 2013/125600

[Patent Literature 2] International Publication No. WO 2013/125601

SUMMARY

Technical Problem

Meanwhile, strength characteristics such as bending strength are important in ferrite sintered magnets. However, conventional ferrite sintered magnets do not necessarily have sufficient strength. The present invention has been made in view of the above circumstances, and an object thereof is to provide a ferrite sintered magnet which does not necessarily contain a rare earth element and Co, and has excellent magnetic properties and strength, and a rotary electrical machine using the same.

Solution to Problem

A ferrite sintered magnet of the present invention is a ferrite sintered magnet comprising M-type ferrite crystal grains having a hexagonal structure, two-crystal grain boundaries formed between two of the M-type ferrite crystal grains, and multiple-crystal grain boundaries surrounded by three or more of the M-type ferrite crystal grains. The ferrite sintered magnet contains at least Fe, Ca, B, and Si, and contains 0.005 to 0.9 mass % of B in terms of $B_2O_3$. The two-crystal grain boundaries and the multiple-crystal grain boundaries contain Si and Ca. Further, in a cross-section parallel to a c-axis of the ferrite sintered magnet, when the number of multiple-crystal grain boundaries having a maximum length of 0.49 to 5 μm per cross-sectional area of 76 μm$^2$ is N, N is 7 or less.

Here, when an area ratio of the two-crystal grain boundaries and the multiple-crystal grain boundaries in the cross-section parallel to the c-axis of the ferrite sintered magnet is Z, it is possible to satisfy 2.51%<Z<5%.

In addition, in a case where an average thickness of the two-crystal grain boundaries in the cross-section parallel to the c-axis of the ferrite sintered magnet is d, it is possible to satisfy 0.683 nm<d<2 nm.

In addition, in the cross-section parallel to the c-axis of the ferrite sintered magnet, when the number of M-type ferrite crystal grains having a maximum diameter of 1 μm or less per cross-sectional area of 76 μm$^2$ is Q, it is possible for Q to be 27 to 119.

In addition, it is possible for a content of Si in the ferrite sintered magnet to be 0.05 to 1.3 mass % in terms of $SiO_2$.

In addition, it is possible for a content of Mn in the ferrite sintered magnet to be 0.25 to 1.5 mass % in terms of MnO.

In addition, it is possible for a content of Cr in the ferrite sintered magnet to be 0.03 to 0.2 mass % in terms of $Cr_2O_3$.

In addition, it is possible for a content of Zn in the ferrite sintered magnet to be 0.01 to 1.47 mass % in terms of ZnO.

In addition, it is possible for the M-type ferrite crystal grains to be M-type Sr ferrite crystal grains or M-type Ba ferrite crystal grains, and in this case, it is possible for a content of Ca in the ferrite sintered magnet to be 0.15 to 2.0 mass % in terms of CaO.

In addition, it is possible for the M-type ferrite crystal grains to be M-type Ca ferrite crystal grains, and it is possible for a content of Ca in the ferrite sintered magnet to be 2 to 5 mass % in terms of CaO.

The ferrite sintered magnet may substantially not contain La and Co.

A rotary electrical machine according to the present invention includes the above-described ferrite sintered magnet.

Advantageous Effects of Invention

According to the present invention, it is possible to obtain a ferrite sintered magnet that does substantially not contain a rare earth element and Co and has excellent magnetic properties and strength.

DETAILED DESCRIPTION

Hereinafter, suitable embodiments of the present invention will be described in detail with reference to the drawings as necessary.

(Ferrite Sintered Magnet)

Figure 1:
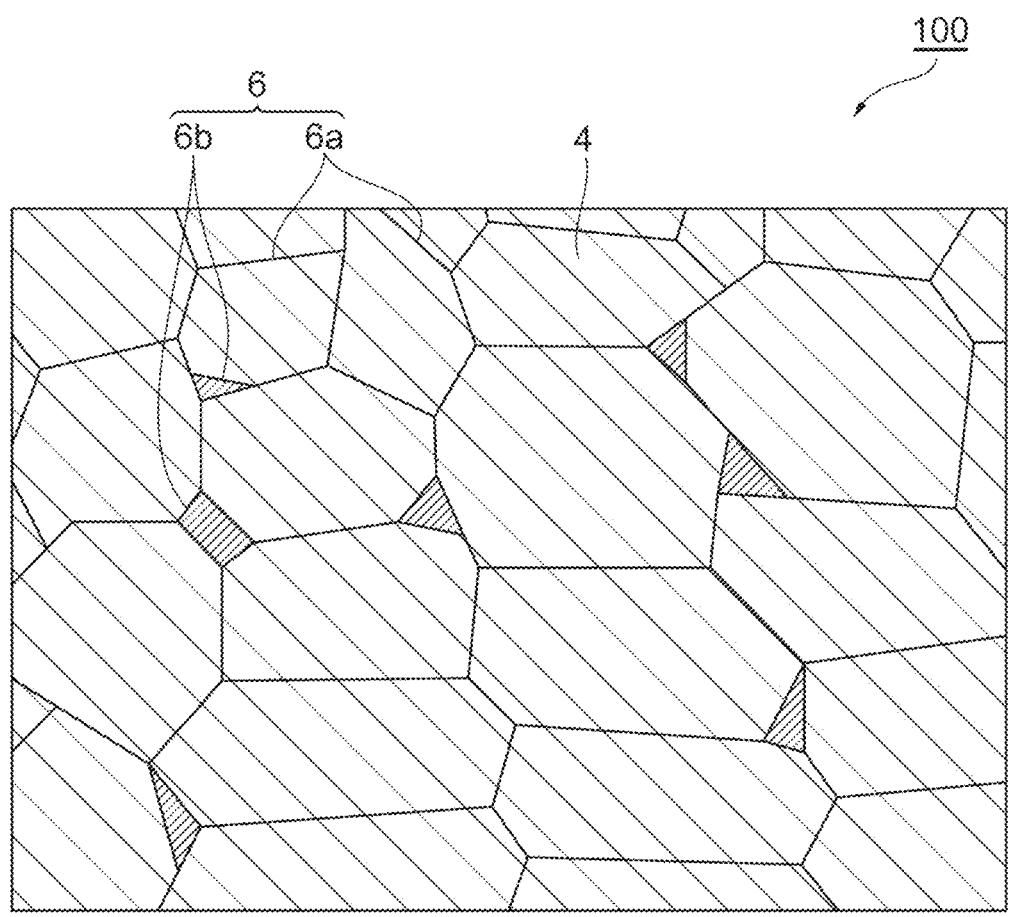
FIG. 1 is a schematic diagram illustrating an example of a cross-sectional structure of a ferrite sintered magnet of the present invention.

As illustrated in FIG. 1, a ferrite sintered magnet 100 according to the embodiment of the present invention has M-type ferrite crystal grains 4 having a hexagonal structure and a grain boundary phase 6 present between the M-type ferrite crystal grains 4.

It is possible for the M-type ferrite crystal grains to contain M-type ferrite represented by the formula (1) as a main component.

$$AX_{12}O_{19} \qquad (1)$$

Here, A includes at least one selected from the group consisting of Sr, Ba, and Ca.

It is possible for the M-type ferrite to be Sr ferrite in which Sr accounts for 34 at % or more of A, Ba ferrite in which Ba accounts for 34 at % or more of A, and Ca ferrite in which Ca accounts for 34 at % or more of A. In the Sr ferrite, Ba ferrite, and Ca ferrite, it is possible for Sr, Ba, and Ca to be the maximum component in the atomic percentage of A, respectively.

It is possible for the remaining elements of A in the Sr ferrite to be at least one selected from the group consisting of Ba and Ca. It is possible for the remaining elements of A in the Ba ferrite to be at least one selected from the group consisting of Sr and Ca. It is possible for the remaining elements of A in the Ca ferrite to be at least one selected from the group consisting of Sr and Ba.

X necessarily contains Fe. The atomic percentage of Fe may be 50% or more. It is possible for the remainder of X to be one or more elements selected from the group consisting of Zn (zinc), Mn (manganese), Al (aluminum), and Cr (chromium).

It is possible for the M-type Sr ferrite to be represented by the following formula (3), for example.

$$Sr_{1-z}R_z(Fe_{12-x}M_x)_yO_{19} \qquad (3)$$

In the above formula (3), x is, for example, 0.01 to 0.5, y is, for example, 0.7 to 1.2, and z is 0 to 0.5, and may be 0 or 0.01 to 0.49, for example. It is possible for R to be Ca and/or Ba.

It is possible for the M-type Ba ferrite to be represented by the following formula (4), for example.

$$Ba_{1-z}R_z(Fe_{12-x}M_x)_yO_{19} \qquad (4)$$

In the above formula (4), x is, for example, 0.01 to 0.5, y is, for example, 0.7 to 1.2, and z is 0 to 0.5, and may be 0 or 0.01 to 0.49, for example. It is possible for R to be Sr and/or Ca.

It is possible for the M-type Ca ferrite to be represented by the following formula (5), for example.

$$Ca_{1-z}R_z(Fe_{12-x}M_x)_yO_{19} \qquad (5)$$

In the above formula (5), x is, for example, 0.01 to 0.5, y is, for example, 0.7 to 1.2, and z is 0 to 0.5, and may be 0 or 0.01 to 0.49, for example. It is possible for R to be Sr and/or Ba.

It is possible for M in the above formulas (3) to (5) to be one or more elements selected from the group consisting of Zn (zinc), Mn (manganese), Al (aluminum), and Cr (chromium).

The ratios of the A sites and the X sites and the ratio of oxygen (O) in the above formulas (3) to (5) show values slightly deviated from the above range in reality, and therefore may be slightly different from the above numerical values.

In a case where the M-type ferrite in the ferrite sintered magnet is represented by the above formulas (3) to (5), it is preferable that M contain Mn and Cr and more preferably contain Mn, Cr, and Zn.

The mass fraction of the M-type ferrite in the M-type ferrite crystal grains is preferably 90% or more, more preferably 95% or more, and still more preferably 97% or more.

The mass ratio of the M-type ferrite crystal grains (main phase) to the entire crystal grains in the ferrite sintered magnet is preferably 90% or more, more preferably 95% or more, and still more preferably 97% or more. As such, it is possible to further increase the magnetic properties by reducing the mass ratio of a crystal phase different from the M-type ferrite phase (heterophase). It is possible to confirm the mass ratio (%) of the M-type ferrite phase in the entire crystal grains of the ferrite sintered magnet by determining the abundance rate (mol %) of the M-type ferrite phase by X-ray diffraction. The abundance rate of the M-type ferrite phase is calculated by mixing powder samples of M-type ferrite, orthoferrite, hematite, spinel, and W-type ferrite at a predetermined ratio, and comparing and calculating from their X-ray diffraction intensities.

In the cross-section parallel to the c-axis of the ferrite sintered magnet, when the number of M-type ferrite crystal grains having a maximum diameter of 1 μm or less per cross-sectional area of 76 μm$^2$ is Q, it is preferable that Q be 27 to 119. The maximum diameter is the diameter of the crystal grain 4 measured in the direction in which the diameter thereof becomes maximum. In addition, the c-axis in the ferrite sintered magnet is an easy magnetization axis in the ferrite sintered magnet.

By setting the number of M-type ferrite crystal grains having a maximum diameter of 1 μm or less to a certain number or more, the squareness ratio improves.

The grain boundary phase 6 is disposed between the M-type ferrite crystal grains 4. The main component of the grain boundary phase 6 is an oxide. It is possible for the constituent elements of the oxide to be at least one or a combination of any two or more selected from B (boron), Si (silicon), Ca (calcium), Sr (strontium), Ba (barium), Fe (iron), Mn (manganese), Zn (zinc), Cr (chromium), and Al (aluminum). Examples of the oxides include $SiO_2$, CaO, BaO, SrO, $Al_2O_3$, ZnO, $Fe_2O_3$, MnO, $Cr_2O_3$, and $B_2O_3$. Silicate glass may also be contained. It is possible for the oxide to occupy 90 mass % or more of the grain boundary phase 6, more preferably 95% or more, and still more preferably 97% or more.

The grain boundary phase 6 necessarily contains Si and Ca. It is possible for the grain boundary phase to further contain B.

The grain boundary phase 6 has two-crystal grain boundaries 6a formed between two of the M-type ferrite crystal grains 4 and multiple-crystal grain boundaries 6b surrounded by three or more of the M-type ferrite crystal grains 4.

In a cross-section parallel to a c-axis of the ferrite sintered magnet, when the number of multiple-crystal grain boundaries having a maximum length of 0.49 to 5 μm per cross-sectional area of 76 μm$^2$ is N, N is 7 or less. Here, the maximum length is the length (diameter) of the multiple-crystal grain boundaries 6b measured in the maximizing direction. It is also possible for N to be 6 or less. N may be 0.

With the number of large multiple-crystal grain boundaries being small, the thickness of the two-crystal grain boundaries 6a becomes large. Therefore, it is considered that magnetic interaction between M-type ferrite crystal grains is suppressed, Hcj is improved and mechanical hardness is also increased.

In a cross-section parallel to the c-axis of the ferrite sintered magnet, when the number of multiple-crystal grain boundaries having a maximum length of 0.088 or more and less than 0.49 μm per cross-sectional area of 76 μm$^2$ is P, it is possible for P to be 8 or more. P may be 10 or more, or 15 or more. It is possible for P to be 200 or less.

With the number of small multiple-crystal grain boundaries being large, the thickness of the two-crystal grain boundaries 6a becomes large. Therefore, it is considered that magnetic interaction between M-type ferrite crystal grains is suppressed, Hcj is improved, and mechanical hardness is also increased.

In the cross-section parallel to the c-axis of the ferrite sintered magnet, it is possible for an area ratio Z of the grain boundary phase 6 (two-crystal grain boundaries 6a and multiple-crystal grain boundaries 6b) to satisfy 2.51%<Z<5%. It is possible to measure the area ratio Z of the grain boundary phase 6 at a cross-sectional area of 76 μm².

When the area of the grain boundary phase 6 is small, it is difficult to obtain the effect of suppressing the magnetic interaction between the M-type ferrite crystal grains, and on the other hand, when the area of the grain boundary phase 6 is too large, the nonmagnetic layer among the whole becomes too large and Br decreases.

In a case where an average thickness of the two-crystal grain boundaries 6a in the cross-section parallel to the c-axis of the ferrite sintered magnet is d, 0.683 nm<d<2 nm can be satisfied. It is possible to obtain the average thickness by, for example, measuring a value at the center of two-crystal grain boundaries that multiple-crystal grain boundaries are placed at the both ends thereof for ten different two-crystal grain boundaries and obtaining the average value thereof.

By satisfying this, the thickness of the two-crystal grain boundaries 6a is not too small, and the effect of suppressing the magnetic interaction between the M-type ferrite crystal grains is easily obtained. When the thickness of the two-crystal grain boundaries 6a is too large, the ratio of the nonmagnetic layer increases and Br decreases.

The ferrite sintered magnet according to the embodiment of the present invention is an oxide containing at least Fe, Ca, B, and Si.

The content of Fe in the ferrite sintered magnet is preferably 80 to 95 mass %, and more preferably 87 to 90 mass % in terms of $Fe_2O_3$. By setting the content within the above range, good magnetic properties can be obtained.

In a case where the M-type ferrite crystal grains are Sr ferrite crystal grains, the content of Sr in the ferrite sintered magnet is preferably 9 to 11 mass %, and more preferably 9 to 10 mass % in terms of SrO.

In a case where the M-type ferrite crystal grains are Ba ferrite crystal grains, the content of Ba in the ferrite sintered magnet is preferably 13 to 17 mass %, and more preferably 13 to 15 mass % in terms of $Ba_2O_3$.

In a case where the M-type ferrite crystal grains are Ca ferrite crystal grains, the content of Ca in the ferrite sintered magnet is preferably 2 to 5 mass %, and more preferably 2 to 4 mass % in terms of CaO.

The ferrite sintered magnet contains B. The content of B in the ferrite sintered magnet is 0.005 to 0.9 mass % in terms of $B_2O_3$. From the viewpoint of further increasing the coercive force and squareness ratio (Hk/HcJ) of the ferrite sintered magnet, the content of B is preferably 0.01 mass % or more in terms of $B_2O_3$. In addition, from the viewpoint of further increasing the residual magnetic flux density (Br) of the ferrite sintered magnet, the content of B is preferably 0.4 mass % or less, and more preferably 0.2 mass % or less in terms of $B_2O_3$.

The ferrite sintered magnet contains Si (silicon). The content of Si in the ferrite sintered magnet is preferably 0.05 to 1.3 mass %, more preferably 0.2 to 0.5 mass %, and still more preferably 0.25 to 0.36 mass % in terms of $SiO_2$. When $SiO_2$ is too much, Br tends to decrease, and when it is too little, HcJ tends to decrease; therefore, by setting the $SiO_2$ content within the above range, an optimum grain boundary phase is formed and thus high magnetic properties are easily obtained.

The ferrite sintered magnet contains Ca (calcium) regardless of whether the main phase is Sr ferrite or Ba ferrite. In a case where the main phase is Sr ferrite or Ba ferrite, the content of Ca in the ferrite sintered magnet is preferably 0.15 to 2.0 mass %, more preferably 0.4 to 1.0 mass %, and still more preferably 0.47 to 0.62 mass % in terms of CaO. When Ca is too much, HcJ tends to decrease, and when it is too little, Br tends to decrease; therefore, by setting the content of Ca within the above range, an optimum grain boundary phase is formed and thus high magnetic properties are easily obtained.

In addition, in a case where the main phase is Sr ferrite, it is possible for the ferrite sintered magnet to contain Ba. The content of Ba is preferably 0 to 0.2 mass % in terms of BaO.

In a case where the main phase is Ca ferrite, it is possible for the ferrite sintered magnet to contain at least one selected from the group consisting of Sr and Ba and the content of Ba is preferably 0 to 1.5 mass % in terms of BaO. The content of Sr is preferably 0 to 1.0 mass % in terms of SrO.

In a case where the main phase is Ba ferrite, it is possible for the ferrite sintered magnet to contain Sr. The content of Sr is preferably 0 to 0.8 mass % in terms of SrO.

It is possible for the ferrite sintered magnet to contain Mn. The content of Mn in the ferrite sintered magnet is preferably 0.25 to 1.5 mass % in terms of MnO. By substituting the Fe sites with Mn satisfying the above range, the effect of improving the magnetic properties can be easily obtained, and the function of promoting the solid solution of Zn is presumed.

It is possible for the ferrite sintered magnet to contain Cr. The content of Cr in the ferrite sintered magnet is preferably 0.03 to 0.2 mass % in terms of $Cr_2O_3$. By substituting the Fe sites with Cr satisfying the above range, the effect of improving the magnetic properties can be easily obtained, and the function of promoting the solid solution of Zn is presumed.

It is possible for the ferrite sintered magnet to contain Zn. The content of Zn in the ferrite sintered magnet is 0.01 to 1.47 mass % in terms of ZnO. From the viewpoint of further increasing the residual magnetic flux density (Br) of the ferrite sintered magnet, the content of Zn is preferably 0.08 mass % or more, and more preferably 0.15 mass % or more in terms of ZnO. In addition, from the viewpoint of further increasing the coercive force and squareness ratio (Hk/HcJ) of the ferrite sintered magnet, the content of Zn is preferably 1.0 mass % or less, and more preferably 0.5 mass % or less in terms of ZnO.

It is considered that saturation magnetization Br improves by selectively substituting Zn for Fe sites having a magnetic moment aligned in the antiparallel direction. On the other hand, the coercive force is lowered because the crystal magnetic anisotropy is lowered due to the substitution of Zn, but it is presumed that the magnetic interaction between crystal grains is suppressed by the homogeneous formation of the grain boundary phase containing B, and the reduction of the coercive force can be suppressed, and the coercive force can be maintained.

It is preferable that the ferrite sintered magnet do substantially not contain rare earth elements and Co (cobalt). The rare earth elements are Sc, Y, La, Ce, Pr, Nd, Pm, Sm, Eu, Gd, Tb, Dy, Ho, Er, Tm, Yb, and Lu.

The ferrite sintered magnet may contain Ni, but it is preferable that the ferrite sintered magnet do substantially not contain Ni. It is possible to set the concentration of Ni to be 0.02 mass % or less.

The ferrite sintered magnet may contain Cu, but it is preferable that the ferrite sintered magnet do substantially not contain Cu. It is possible to set the concentration of Cu to be 0.02 mass % or less.

By not containing these metals, the cost reduction becomes possible.

Here, "the ferrite sintered magnet does not substantially contain the element A" means that the concentration of the element A in the ferrite sintered magnet is less than 0.005 mass % in terms of oxide. It is preferable that the concentration of the element A be less than 0.001 mass % in terms of oxide.

The ferrite sintered magnet does not need to contain Al, but may contain Al. It is possible to set the content of Al to be 0 to 0.2 mass % in terms of $Al_2O_3$.

The ferrite sintered magnet does not need to contain Na, and it is preferable substantially not to contain Na. The content of Na is preferably 0.005 mass % or less in terms of $Na_2O$. It is still more preferable that it be 0.001 mass % or less. The smaller the Na content, the better the moldability.

In the ferrite sintered magnet, in addition to these components, impurities contained in the raw materials or unavoidable components derived from production facilities may be contained. Examples of such components include oxides of Mg (magnesium), Ti (titanium), Mo (molybdenum), V (vanadium), and the like. It is preferable that the content of these be 0.06 mass % or less in total.

It is possible to measure the content of each component of the ferrite sintered magnet using fluorescent X-ray analysis and inductively coupled plasma emission spectroscopic analysis (ICP analysis).

The residual magnetic flux density (Br) of the ferrite sintered magnet is preferably 420 mT or more, more preferably 440 mT or more, and still more preferably 450 mT or more. The coercive force of the ferrite sintered magnet is preferably 260 kA/m or more, more preferably 270 kA/m or more, and still more preferably 280 kA/m or more. The squareness ratio (Hk/HcJ) of the ferrite sintered magnet is preferably 85% or more, more preferably 88% or more, and still more preferably 90% or more. In particular, the ferrite sintered magnet preferably has a residual magnetic flux density (Br) of 440 mT or more and a squareness ratio (Hk/HcJ) of 85% or more. By having such excellent magnetic properties, it is possible to use more suitably for motors and generators.

Moreover, it is possible for the ferrite sintered magnet to have sufficient mechanical strength. Ferrite sintered magnets with high mechanical strength are easy to handle and can effectively prevent cracking and chipping during conveyance and thus product yield is improved, thereby contributing to cost reduction. Furthermore, since the ferrite sintered magnet having high mechanical strength is not easily broken after being incorporated in a product such as a motor, the reliability of the product can be improved.

There is no particular limitation on the shape of the ferrite sintered magnet, and various shapes such as an arc segment (C-type) shape that is curved such that the end face thereof has an arc shape, a flat plate shape, and the like can be taken.

It is possible to use the ferrite sintered magnet as rotary electrical machines such as motors and generators, magnets for speaker/headphone, magnetron tubes, magnetic field generators for MRI, dampers for CD-ROM, sensors for distributor, sensors for ABS, fuel/oil level sensor, magnet latches, or magnetic field generating members such as isolator. Moreover, it is also possible to use as a target (pellet) when the magnetic layer of the magnetic recording medium is formed by vapor deposition or sputtering.

(Rotary Electrical Machine)

Figure 2:
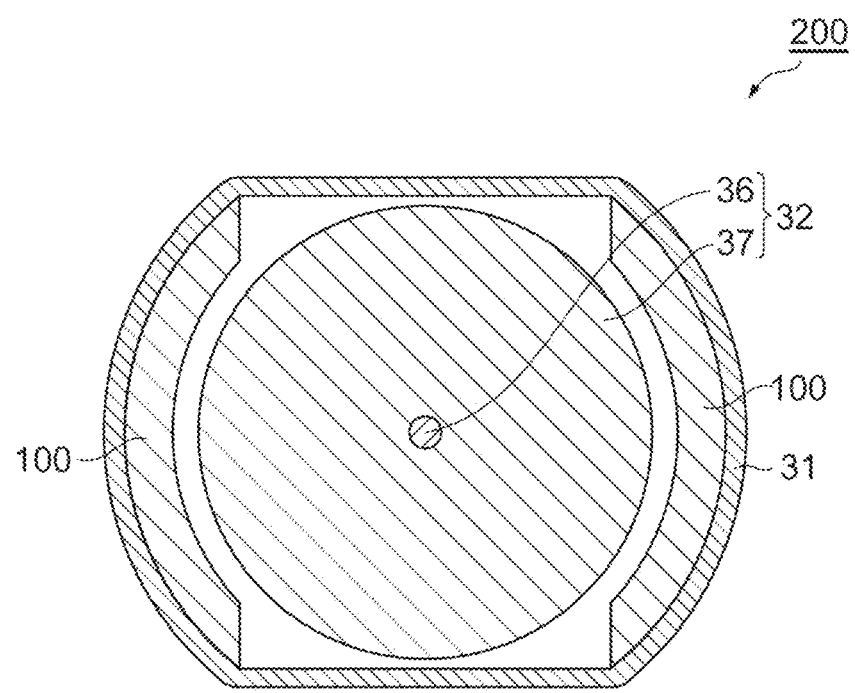
FIG. 2 is a schematic cross-sectional view of a motor having the ferrite sintered magnet of the present invention.

FIG. 2 shows a motor according to an embodiment of the present invention. The motor 200 includes a stator 31 and a rotor 32. The rotor 32 has a shaft 36 and a rotor core 37. In the motor 200 of the present embodiment, a C-shaped ferrite sintered magnet 100 that is a permanent magnet in the stator 31, and an electromagnet (coil) is provided in the rotor core 37 of the rotor 32.

Since the ferrite sintered magnet 100 has a high Br content, the thickness can be reduced, so that the gap between the stator 31 and the rotor 32 can be sufficiently reduced. Hence, the motor 200 can be miniaturized while maintaining the performance.

Alternatively, the motor may be a motor in which the ferrite sintered magnet is provided in the rotor and the electromagnet (coil) is provided in the stator may be used. There is no particular limitation on the form of the motor. Another example of the rotary electrical machine is a generator having a rotor and a stator. It is possible for the ferrite sintered magnet to be provided on the rotor or stator in this case as well.

(Production Method)

Next, an example of a method of producing the ferrite sintered magnet will be described. The method of producing the ferrite sintered magnet includes a blending step, a calcination step, a pulverization step, a molding step in a magnetic field, and a firing step. The details of the respective steps will be described below.

The blending step is a step of preparing a mixed powder for calcination. It is possible for the mixed powder for calcination to be a powder containing all the metal elements constituting the M-type ferrite. In the blending step, it is preferable to mix a plurality of types of powders such as a powder containing Fe and a powder containing Sr with an attritor or a ball mill for about 1 to 20 hours and performing a pulverization treatment to obtain a mixed powder.

In the blending step, a powder containing other metal elements contained in the ferrite sintered magnet other than the metal elements constituting the ferrite, and a powder containing a metalloid element may be mixed. Examples of other powders include a powder containing Si, a powder containing Ca, a powder containing Zn, and a powder containing B.

Examples of the powder containing each element include a simple substance of each element, oxides, hydroxides, carbonates, nitrates, silicates, and organometallic compounds of each element. One powder may contain two or more metal elements, or one powder may contain substantially only one metal element. One powder may contain a metal element and a metalloid element.

An example of the powder containing Fe is $Fe_2O_3$.

Examples of the powder containing Sr are $SrCO_3$ and SrO.

An example of the powder containing Si is $SiO_2$.

Examples of the powder containing Ca are $CaCO_3$ and CaO.

An example of the powder containing Zn is ZnO.

An example of a powder containing Ba is BaO.

An example of the powder containing B is $H_3BO_3$.

Since B tends to dissolve in water and evaporate by heat, it is preferable to add B in a larger amount as appropriate.

In particular, as a compound containing B, $H_3BO_3$ is preferable rather than $B_2O_3$, and it is desirable to add the whole amount in the blending step. $H_3BO_3$ has a higher solubility in water than $B_2O_3$ and thus can be homogeneously dispersed at the molecular level (boric acid 5.7 g/100 ml, boron oxide 3.6 g/100 ml at 25° C.), and since the specific gravity of boric acid is lower (1.5 g/cm³ for boric acid and 1.9 g/cm³ or more for boron oxide), dispersion during stirring and mixing is easier. Furthermore, even in a case where an undissolved portion remains, boric acid decomposes at a relatively low temperature, so that homogeneous dispersion can be expected. (Decomposition temperature: 171° C. for boric acid, 450° C. for boron oxide). Furthermore, by adding the whole amount in the blending step, it is possible to obtain the maximum effect that boron forms a homogeneous structure with other components during calcination.

That is, by adding the whole amount of $H_3BO_3$ in the blending step, for example, it is possible to reduce the number N of large multiple-crystal grain boundaries 6b, it is possible to increase the number P of small multiple-crystal grain boundaries 6b, thus formation of two-crystal grain boundaries 6a that has a large average thickness d becomes possible, and thus it is possible to increase the number Q of ferrite crystal grains of 1 μm or less. Therefore, it is considered that it is possible to obtain high magnetic properties and strength.

The average particle diameter of the raw material powder is not particularly limited and is, for example, 0.1 to 2.0 μm.

Also, it is possible for a small amount of additive elements such as Cr, Mn, Al, and Ba that may be contained in the final ferrite sintered magnet product to be included in the powder in advance. In a case where these elements added in a small amount are little in the powder, as necessary, a mixed powder for calcination by adding a powder containing Cr ($Cr_2O_3$), a powder containing Mn (MnO), a powder containing Al ($Al_2O_3$), a powder containing Ba (BaO) or the like in the blending step.

The composition of the metal and metalloid elements in the mixed powder roughly matches the composition of the final ferrite sintered magnet product, but does not match exactly because elements that disappear during the producing steps exist.

The calcination step is a step of calcining the mixed powder obtained in the blending step. It is possible to perform the calcination in an oxidizing atmosphere such as air. The calcining temperature is preferably 850 to 1450° C., more preferably 900 to 1350° C., and still more preferably 1000 to 1300° C., and the calcining time at the calcining temperature is preferably 1 second to 10 hours, and more preferably 1 minute to 3 hours. The content of M-type ferrite in the calcined product obtained by calcining is preferably 70 mass % or more, and more preferably 90 mass %. The primary particle size of the calcined product is preferably 10 μm or less, more preferably 3.0 μm or less.

The pulverization step is a step of pulverizing the calcined product to obtain an M-type ferrite magnet powder. The pulverization step may be performed in one stage, or may be performed in two stages, a coarse pulverization step and a fine pulverization step. Since the calcined product is usually granular or massive, it is preferable to first perform a coarse pulverization step. In the coarse pulverization step, by performing dry pulverization using a vibrating rod mill or the like, a pulverized powder having an average particle size of 0.5 to 5.0 μm is prepared. The pulverized powder thus prepared is wet pulverized using a wet attritor, ball mill, jet mill or the like to obtain a fine powder having an average particle size of 0.08 to 5.0 μm, preferably 0.1 to 2.5 μm, and more preferably 0.2 to 2 μm.

The specific surface area of the fine powder by the BET method is preferably 5 to 14 m²/g, and more preferably 7 to 12 m²/g. The pulverization time is 30 minutes to 20 hours in a case where a wet attritor is used and 5 to 50 hours in a case where a ball mill is used. It is preferable to appropriately adjust these times according to the pulverization method.

In the pulverization step, a powder containing a metal elements and/or a metalloid element (Si, Ca, Ba, Sr, Zn, B, etc.) and/or a powder containing a small amount of additive element such as Cr, Mn, Al, Ba may be added with respect to the M-type ferrite magnet powder.

In order to increase the degree of magnetic orientation of the ferrite sintered magnet, it is preferable to add, in addition to the above components, polyhydric alcohol in the fine pulverization step. The amount of the polyhydric alcohol added is 0.05 to 5.0 mass %, preferably 0.1 to 3.0 mass %, and more preferably 0.1 to 2.0 mass % with respect to the subject of addition. The added polyhydric alcohol is thermally decomposed and removed in the firing step after the molding step in a magnetic field.

The molding step in a magnetic field is a step of producing a molded body by molding the fine powder obtained in the pulverization step in a magnetic field. It is possible to perform the molding step in a magnetic field by either dry molding or wet molding. From the viewpoint of increasing the degree of magnetic orientation, wet molding is preferred. In a case where the wet molding is performed, the fine pulverization step may be performed in a wet manner, and the obtained slurry may be adjusted to a predetermined concentration to form a wet molding slurry. It is possible to concentrate the slurry by centrifugation or a filter press.

The content of fine powder in the slurry for wet molding is preferably 30 to 85 mass %. It is possible to use water or a non-aqueous solvent as the dispersion medium of the slurry. In addition to water, a surfactant such as gluconic acid, gluconates, or sorbitol may be added to the slurry for wet molding. Molding in a magnetic field is performed using such a slurry for wet molding. The molding pressure is, for example, 0.1 to 0.5 ton/cm², and the magnetic field to be applied is, for example, 5 to 15 kOe.

A firing step is a step of firing a molded body and obtaining a sintered body. The firing step is usually performed in an oxidizing atmosphere such as the air. The firing temperature is preferably 1050° C. to 1300° C. and more preferably 1150° C. to 1250° C. The firing time at the firing temperature is preferably 0.5 to 3 hours. It is possible to produce a sintered body, that is, a ferrite sintered magnet through the above steps. The method of producing a ferrite sintered magnet of the present invention is not limited to the above-mentioned method.

EXAMPLES

Hereinafter, the contents of the present invention will be described in more detail with reference to Examples and Comparative Examples, but the present invention is not limited to these Examples.

(Production of Ferrite Sintered Magnet)

First, the following starting materials were prepared.

$Fe_2O_3$ powder (primary particle size: 0.3 μm)

$SrCO_3$ powder (primary particle size: 2 μm)

SiO$_2$ powder (primary particle size: 0.01 μm)
CaCO$_3$ powder
ZnO powder
H$_3$BO$_4$ powder Example 1

1000 g of Fe$_2$O$_3$ powder, 161 g of SrCO$_3$ powder, 12.1 g of CaCO$_3$ powder, 4.33 g of SiO$_2$ powder, 3.5 g of ZnO powder and 0.34 g of H$_3$BO$_4$ powder were mixed while being pulverized using a wet attritor, and dried and sized. The powder thus obtained was fired at 1250° C. for 1 hour in the air to obtain a granular calcined product. The calcined product was coarsely pulverized using a dry vibrating rod mill to prepare a powder having a specific surface area of 1 m$^2$/g by the BET method.

A predetermined amount of sorbitol was added to 200 g of the coarsely pulverized powder, and wet pulverization was performed for 24 hours using a ball mill to obtain a slurry. The amount of sorbitol added was 0.25 mass % based on the mass of the coarsely pulverized powder. The specific surface area of the fine powder after pulverization was 8 to 10 m$^2$/g.

Thereafter, the solid content concentration of the slurry was adjusted, and molding was performed using a wet magnetic field molding machine in an applied magnetic field of 12 kOe to obtain a molded body. Three such molded bodies were produced. These molded bodies were fired in the air at 1180, 1195, and 1210° C., respectively, to obtain cylindrical ferrite sintered magnets (Example 1).

Examples 2 to 6, Comparative Example 1

Magnets of Examples 2 to 6 and Comparative Example 1 were obtained in the same manner as Example 1 except that the amount of H$_3$BO$_4$ powder added was changed.

Examples 7 and 8

Magnets of Examples 7 and 8 were obtained in the same manner as Example 4 except that the amount of Mn added was changed by selecting raw material sources having different Mn contents.

Examples 9 and 10

Magnets of Examples 9 and 10 were obtained in the same manner as Example 4 except that the amount of Cr added was changed by selecting raw material sources having different Cr contents.

Examples 11 and 12

Magnets of Examples 11 and 12 were obtained in the same manner as Example 4 except that the amount of ZnO added was changed.

Examples 13 and 14

Magnets of Examples 13 and 14 were obtained in the same manner as Example 4 except that the amount of SiO$_2$ added was changed.

Examples 15 and 16

Magnets of Examples 15 and 16 were obtained in the same manner as Example 4 except that the amount of CaCO$_3$ added was changed.

[Evaluation of Ferrite Sintered Magnet]
<Composition Analysis>

The compositions of the produced ferrite sintered magnets of each Example and each Comparative Example were measured by inductively coupled plasma emission spectroscopic analysis (ICP analysis). In the ferrite sintered magnet, in addition to elements such as Fe, Sr, Si, Ca, Zn, and B, elements derived from impurities (Ba, Al, Mn, Cr, etc.) contained in the starting material were detected.

The contents of Fe, Sr, Ba, Al, Si, Ca, Mn, Zn, Cr, Na, and B detected when converted into Fe$_2$O$_3$, SrO, BaO, Al$_2$O$_3$, SiO$_2$, CaO, MnO, ZnO, Cr$_2$O$_3$, Na$_2$O, and B$_2$O$_3$, respectively, are shown in Table 1. These contents are values (mass %) based on the entire ferrite sintered magnet.

Evaluation on Magnetic Properties

The upper and lower surfaces of the prepared cylindrical ferrite sintered magnet were machined, and then the magnetic properties of the ferrite sintered magnet were measured at a maximum magnetic field applied of 25 kOe using a BH tracer. In the measurement, the residual magnetic flux density (Br) and the coercive force (HcJ) are deters tined, and the external magnetic field strength (Hk) at which the residual magnetic flux density (Br) becomes 90% was measured, and the squareness ratio (Hk/HcJ) (%) was determined based on this. Among the ferrite sintered magnets produced at firing temperatures of 1180° C., 1195° C., and 1210° C. in Examples and Comparative Examples, the magnetic properties of ferrite sintered magnets produced at 1195° C. where the balance between residual magnetic flux density (Br) and squareness ratio (Hk/HcJ) is the best are shown in Table 1.

<Evaluation of Mechanical Strength>

Figure 3A:
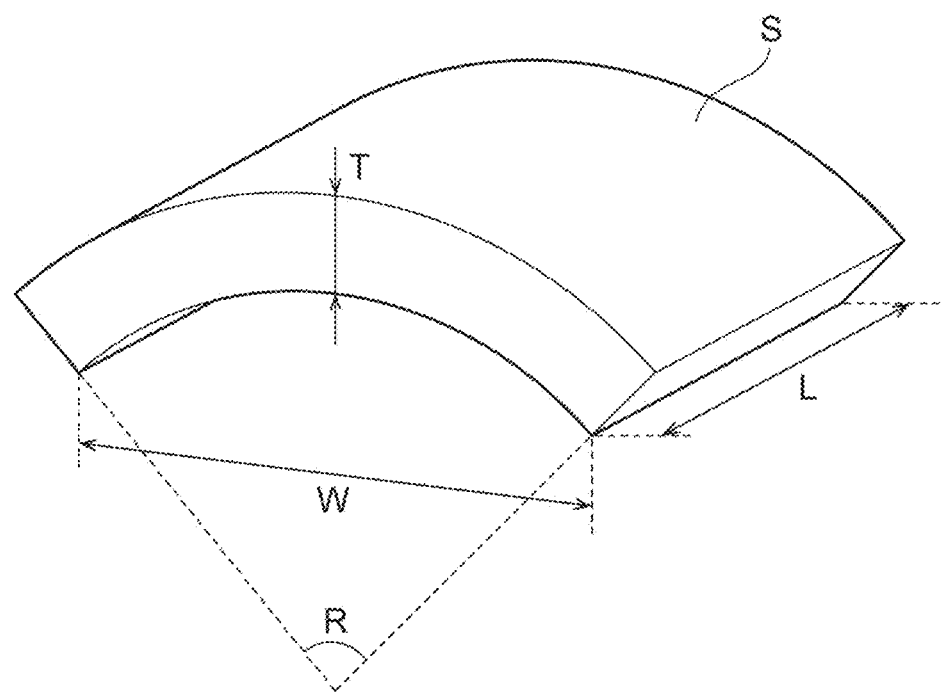
FIG. 3A is a perspective view of a ferrite sintered magnet S having been subjected to a bending strength test.

Under the following conditions, the bending strength (σ) of the ferrite sintered magnet was measured by a three-point bending test. First, apart from the cylindrical ferrite sintered magnet described above, an arc-shaped ferrite sintered magnet S as shown in FIG. 3A (length L is 34 mm, width W is 25.5 mm, thickness T is 3.7 mm, when assuming a circle including an arc, the angle R between lines in contact from the center of the circle to both ends of the arc is 130 degrees) was prepared. The firing temperature was 1195° C.

Figure 3B:
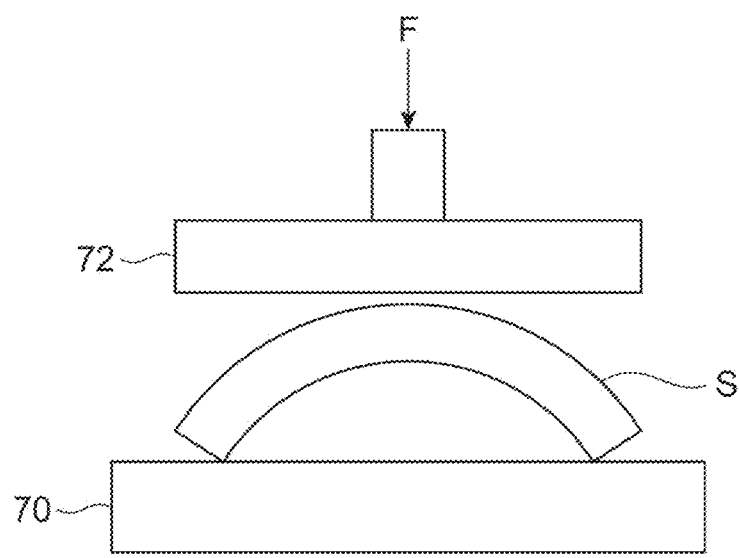
FIG. 3B is a schematic diagram of the bending strength test.

Next, as shown in FIG. 3B, an arc-shaped ferrite sintered magnet S was placed on a horizontal base 70, and a load F was applied in the direction of the arrow from the upper side to the lower side by a jig 72 (speed 3 mm/min), the fracture maximum load F [N] when the ferrite sintered magnet S was broken was measured to determine the bending strength (σ) from the following formula. The bending strength (σ) is an average value of 30 samples.

$$\sigma [N/mm^2] = 3 \times L \times F / (2 \times W \times T^2)$$

<Observation of Cross-Section of Ferrite Sintered Magnet>

The cross-section parallel to the c-axis (namely, a-plane) of the obtained anisotropic sintered ferrite magnet was observed with a STEM (scanning transmission electron microscope), and from the HAADF-STEM image magnified 10000 times, the number Q of M-type ferrite crystal grains of 1 μm or less in the range of 76 μm$^2$ was calculated.

In addition, the cross-section was observed with STEM-EDX (energy dispersive X-ray analyzer attached to the scanning transmission electron microscope), and the main phase and the grain boundary phase were separated by binarization processing of the image data obtained by element mapping at 10000 times, and in the range of 76 μm$^2$, the size and number N and P of the multiple-crystal grain boundarys, and the area ratio Z of the grain boundary phase were calculated.

Further, the above cross-section was observed with a TEM (transmission electron microscope), and the average thickness d of the two-crystal grain boundaries was measured from the HAADF-STEM image magnified 2 to 3 million times.

TABLE 1

| | Ferrite sintered magnet composition in terms of oxide | | | | | | | | | | |
|---|---|---|---|---|---|---|---|---|---|---|---|
| | $Fe_2O_3$ Mass % | SrO Mass % | BaO Mass % | $Al_2O_3$ Mass % | $SiO_2$ Mass % | CaO Mass % | MnO Mass % | ZnO Mass % | $Cr_2O_3$ Mass % | $Na_2O$ Mass % | $B_2O_3$ Mass % | Total |
| Example 1 | 89.038 | 9.245 | 0.080 | 0.075 | 0.295 | 0.548 | 0.349 | 0.282 | 0.082 | 0.000 | 0.006 | 100 |
| Example 2 | 88.916 | 9.373 | 0.074 | 0.075 | 0.294 | 0.540 | 0.349 | 0.282 | 0.082 | 0.000 | 0.015 | 100 |
| Example 3 | 88.955 | 9.321 | 0.083 | 0.061 | 0.293 | 0.552 | 0.349 | 0.272 | 0.084 | 0.000 | 0.030 | 100 |
| Example 4 | 88.943 | 9.320 | 0.062 | 0.072 | 0.294 | 0.528 | 0.349 | 0.282 | 0.082 | 0.000 | 0.068 | 100 |
| Example 5 | 88.877 | 9.284 | 0.084 | 0.061 | 0.301 | 0.552 | 0.348 | 0.273 | 0.079 | 0.000 | 0.141 | 100 |
| Example 6 | 88.476 | 9.276 | 0.083 | 0.060 | 0.301 | 0.535 | 0.347 | 0.280 | 0.082 | 0.000 | 0.560 | 100 |
| Comparative Example 1 | 88.966 | 9.327 | 0.078 | 0.063 | 0.295 | 0.557 | 0.350 | 0.272 | 0.092 | 0.000 | 0.000 | 100 |
| Example 7 | 88.898 | 9.415 | 0.085 | 0.062 | 0.303 | 0.542 | 0.250 | 0.281 | 0.096 | 0.000 | 0.068 | 100 |
| Example 8 | 87.793 | 9.290 | 0.084 | 0.060 | 0.299 | 0.523 | 1.486 | 0.280 | 0.093 | 0.000 | 0.067 | 100 |
| Example 9 | 88.991 | 9.325 | 0.062 | 0.072 | 0.295 | 0.526 | 0.349 | 0.282 | 0.030 | 0.000 | 0.068 | 100 |
| Example 10 | 88.893 | 9.231 | 0.081 | 0.061 | 0.306 | 0.534 | 0.349 | 0.278 | 0.200 | 0.000 | 0.067 | 100 |
| Example 11 | 89.013 | 9.379 | 0.084 | 0.059 | 0.301 | 0.540 | 0.349 | 0.103 | 0.104 | 0.000 | 0.068 | 100 |
| Example 12 | 88.754 | 9.249 | 0.081 | 0.061 | 0.305 | 0.550 | 0.349 | 0.479 | 0.105 | 0.000 | 0.067 | 100 |
| Example 13 | 89.171 | 9.246 | 0.080 | 0.075 | 0.080 | 0.554 | 0.352 | 0.278 | 0.096 | 0.000 | 0.068 | 100 |
| Example 14 | 88.275 | 9.266 | 0.082 | 0.061 | 0.973 | 0.534 | 0.348 | 0.287 | 0.107 | 0.000 | 0.067 | 100 |
| Example 15 | 89.135 | 9.436 | 0.088 | 0.063 | 0.304 | 0.170 | 0.352 | 0.287 | 0.097 | 0.000 | 0.068 | 100 |
| Example 16 | 88.059 | 9.316 | 0.084 | 0.060 | 0.300 | 1.390 | 0.349 | 0.281 | 0.094 | 0.000 | 0.067 | 100 |

TABLE 2

| | Structure of ferrite sintered magnet | | | | | Magnetic properties | | | Strength |
|---|---|---|---|---|---|---|---|---|---|
| | N Number | P Number | Z % | d nm | Q Number | Br mT | HcJ kA/m | Hk/HcJ % | σ N/mm² |
| Example 1 | 6 | 21 | 2.87 | 0.701 | 38 | 446.2 | 260 | 85.5 | 176 |
| Example 2 | 2 | 40 | 3.01 | 0.720 | 50 | 445.8 | 284.8 | 89.3 | 180 |
| Example 3 | 3 | 57 | 3.31 | 0.740 | 68 | 450.2 | 281.9 | 91.7 | 185 |
| Example 4 | 2 | 55 | 3.29 | 0.739 | 64 | 453.1 | 285 | 93.3 | 189 |
| Example 5 | 2 | 51 | 3.36 | 0.770 | 72 | 450.7 | 288.3 | 91.1 | 188 |
| Example 6 | 2 | 53 | 3.41 | 0.798 | 69 | 440.1 | 295.2 | 90.5 | 186 |
| Comparative Example 1 | 8 | 7 | 2.51 | 0.683 | 26 | 447.2 | 180.9 | 76.7 | 145 |
| Example 7 | 2 | 56 | 3.32 | 0.718 | 69 | 452.2 | 280.1 | 91.2 | 174 |
| Example 8 | 3 | 49 | 3.30 | 0.718 | 68 | 450.1 | 289.5 | 90.1 | 188 |
| Example 9 | 2 | 53 | 3.29 | 0.768 | 58 | 453.1 | 285 | 93.3 | 172 |
| Example 10 | 3 | 61 | 3.27 | 0.759 | 61 | 450.3 | 288.7 | 90.3 | 185 |
| Example 11 | 3 | 60 | 3.4 | 0.748 | 84 | 445.3 | 301.2 | 92.2 | 181 |
| Example 12 | 2 | 48 | 3.59 | 0.823 | 47 | 451.8 | 271.4 | 89.7 | 189 |
| Example 13 | 2 | 29 | 3.02 | 0.702 | 48 | 452.4 | 260.1 | 85.1 | 177 |
| Example 14 | 3 | 59 | 3.61 | 0.817 | 92 | 420.2 | 298.6 | 95.1 | 175 |
| Example 15 | 4 | 44 | 3.31 | 0.744 | 76 | 440.1 | 264.2 | 92.9 | 172 |
| Example 16 | 2 | 46 | 3.46 | 0.786 | 31 | 452.8 | 263.3 | 86.3 | 182 |

As shown in Table 1 and Table 2, the ferrite sintered magnets of Examples had a residual magnetic flux density (Br) of 420 mT or more. Further, the coercive force (HcJ) was 260 kA/m or more, and the squareness ratio (Hk/HcJ) was 85% or more. Further, the strength σ was 172 N/mm² or more. That is, it was confirmed that the ferrite sintered magnet of the present invention exhibits excellent magnetic properties and strength when N is 6 or less.

REFERENCE SIGNS LIST

4 . . . M-type ferrite crystal grains (main phase), 6 . . . grain boundary phase, 6a . . . two-crystal grain boundaries, 6b . . . multiple-crystal grain boundaries, 100 . . . ferrite sintered magnet or bond magnet.

What is claimed is:
1. A ferrite sintered magnet comprising:
M-type ferrite crystal grains having a hexagonal structure;
two-crystal grain boundaries formed between two of the M-type ferrite crystal grains; and
multiple-crystal grain boundaries surrounded by three or more of the M-type ferrite crystal grains,
wherein the ferrite sintered magnet contains at least Fe, Ca, B, and Si,
the ferrite sintered magnet contains 0.005 to 0.9 mass % of B in terms of $B_2O_3$,
the two-crystal grain boundaries and the multiple-crystal grain boundaries contain Si and Ca, and
in a cross-section parallel to a c-axis of the ferrite sintered magnet, when the number of multiple-crystal grain boundaries having a maximum length of 0.49 to 5 μm per cross-sectional area of 76 μm² is N, N is 7 or less.

2. The ferrite sintered magnet according to claim 1,
wherein when an area ratio of the two-crystal grain boundaries and the multiple-crystal grain boundaries in the cross-section parallel to the c-axis of the ferrite sintered magnet is Z, 2.51%<Z<5% is satisfied.

3. The ferrite sintered magnet according to claim 1,
wherein in a case where an average thickness of the two-crystal grain boundaries in the cross-section parallel to the c-axis of the ferrite sintered magnet is d, 0.683 nm<d<2 nm is satisfied.

4. The ferrite sintered magnet according to claim 1,
wherein in the cross-section parallel to the c-axis of the ferrite sintered magnet, when the number of M-type ferrite crystal grains having a maximum diameter of 1 μm or less per cross-sectional area of 76 μm$^2$ is Q, Q is 27 to 119.

5. The ferrite sintered magnet according to claim 1,
wherein a content of Si in the ferrite sintered magnet is 0.05 to 1.3 mass % in terms of $SiO_2$.

6. The ferrite sintered magnet according to claim 1,
wherein a content of Mn in the ferrite sintered magnet is 0.25 to 1.5 mass % in terms of MnO.

7. The ferrite sintered magnet according to claim 1,
wherein a content of Cr in the ferrite sintered magnet is 0.03 to 0.2 mass % in terms of $Cr_2O_3$.

8. The ferrite sintered magnet according to claim 1,
wherein a content of Zn in the ferrite sintered magnet is 0.01 to 1.47 mass % in terms of ZnO.

9. The ferrite sintered magnet according to claim 1,
wherein the M-type ferrite crystal grains are M-type Sr ferrite crystal grains or M-type Ba ferrite crystal grains, and
a content of Ca in the ferrite sintered magnet is 0.15 to 2.0 mass % in tetras of CaO.

10. The ferrite sintered magnet according to claim 1,
wherein the M-type ferrite crystal grains are M-type Ca ferrite crystal grains, and
a content of Ca in the ferrite sintered magnet is 2 to 5 mass % in terms of CaO.

11. The ferrite sintered magnet according to claim 1,
wherein the ferrite sintered magnet does substantially not contain La or Co.

12. A rotary electrical machine comprising the ferrite sintered magnet according to claim 1.

* * * * *